United States Patent [19]
Burke

[11] 3,754,878
[45] Aug. 28, 1973

[54] ABRASIVE CLEANING COMPOSITIONS
[75] Inventor: Richard L. Burke, San Diego, Calif.
[73] Assignee: Colgate-Palmolive Company, New York, N.Y.
[22] Filed: Jan. 4, 1971
[21] Appl. No.: 103,821

Related U.S. Application Data
[63] Continuation-in-part of Ser. No. 668,667, Sept. 18, 1967, abandoned.

[52] U.S. Cl..................... 51/307, 51/308, 51/309, 106/3
[51] Int. Cl............................................ B24d 3/02
[58] Field of Search.................... 51/304, 307, 308, 51/309; 106/3

[56] References Cited
UNITED STATES PATENTS
| | | | |
|---|---|---|---|
| 3,450,515 | 6/1969 | Amero | 51/308 |
| 3,385,682 | 5/1968 | Lowen | 106/3 |
| 3,248,235 | 4/1966 | Pryor | 106/3 |
| 3,526,600 | 9/1970 | Shamsi | 106/3 |

Primary Examiner—Donald J. Arnold
Attorney—Herbert S. Sylvester, Murray M. Grill, Norman Blumenkopf, Ronald S. Cornell, Thomas J. Corum, Richard N. Miller, Robert L. Stone and Kenneth A. Koch

[57] ABSTRACT

This disclosure relates to abrasive cleansing compositions having particular utility as a metallic stain remover from hard surfaces such as porcelain, comprising an oxidant capable of oxidizing the metal in a practical time such as the metallic ions ferric, stannous, cupric and mercuric, a halide promotor, and an abrasive, said composition having a pH of 0.5 - 5. Additives such as detergents, perfumes, fillers, colorants, etc. may be included provided they do not adversely effect the stain removing properties of the composition. Although aluminum pot marks are most often encountered in normal household cleaning, said cleansers are effective against other metallic stains such as iron, tin, magnesium, etc.

7 Claims, No Drawings

ABRASIVE CLEANING COMPOSITIONS

This application is a continuation-in-part of application Ser. No. 668,667, filed Sept. 18, 1967 and now abandoned.

This invention relates to compositions particularly adapted for removal of metallic stains such as and particularly aluminum pot marks from procelain or ceramic surfaces.

There are many household cleansers on the market which have good food stain removal ability but depend on abrasive action with or withut alkalinity for aluminum pot marks removal from porcelain or enamel surfaces such as sinks or similar fixtures. Said abrasive action entails scrubbing which inevitably results in scratched surfaces. Chemical removal of aluminum from aforesaid surfaces by cleansers is minimal, if any. This difficulty in removing metallic stains from ceramic surfaces is increased as the sink or like fixture becomes old and more damaged from use. A good stain removal cleanser must be effective in a very short time because in normal use the contact time between the cleanser and the stain is much less than a minute. The complete removal of the stain depends upon the condition of the surface, the severity of the stain, and the speed of the removal system.

It has now been found that aluminum pot marks and other metallic stains such as tin, magnesium and iron can be effectively removed in a practical time from procelain or ceramic surfaces, by the conjoint chemical and mechanical action of a composition containing as the essential ingredients an oxidant, a promotor and an abrasive. The mechanism of the chemical reaction in the case of aluminum pot marks is the conversion to $Al^{+3}$ or some other soluble form of the ion, which is readily removed by the mechanical action of the abrasive.

More specifically, the cleansing composition for removal of metallic stains from hard surfaces comprises a metallic salt oxidant, a halide activator and an abrasive, having a pH of 0.5 – 5. The lower pH limit is determined by a desire to avoid irritation to housewives' hands, while the upper limit is determined by the precipitation of the heavy metal hydroxide thereby removing the metallic ion for effective oxidation.

The oxidant ingredient must be capable of oxidizing the metal in the stain such as aluminum, in a practical time. Suitable metallic ions are those with higher oxidation potentials such as ferric, stannous, cupric, mercuric, auric and silver. The most effective metallic salt is mercuric chloride, followed by cupric chloride, stannous chloride, ferric chloride, auric chloride and silver nitrate. The anion is not critical and consequently any suitable salt of the aforementioned cations may be used provided the selected salt is water soluble to the extent of at least at 2 percent by weight thereof in water and yields the cation of the metal in water. The most effective metallic salt, mercuric, is unique because it forms a liquid metal, but its ability to remove aluminum stains is not due to the formation of a liquid metal. Metallic ions with oxidation potentials closer to aluminum are probably effective over a long time period but for removal of aluminum stains in a practical time, ferrous ion was only marginally effective and zinc ion showed little or no reaction. Non-metallic oxidants, such as sodium perchlorate and potassium iodate show marginal removal at the desired use pH's. These latter oxidants react more rapidly in stronger acid solutions, which is undesirable for household use. The hydrogen ion itself present at the acid pH assists in the oxidation of the metal stain. Hydrogen peroxide may be used as a supplementary oxidant along with the metal salt. The amount of oxidant found effective herein constitutes about 2 – 20 percent by weight of the total composition.

The abrasive must be combined with the metallic oxidant to insure the mechanical removal of the appropriate metal that normally deposits on the metallic stain during the oxidation reaction. This frees the aluminum surface for further oxidation reaction via the metallic oxidant, as well as adding its own abrasive action. Any abrasive may be employed inclusive of silex (silica flour), feldspar, ground quartz, pumice, chalk, tripoli, kieselguhr, diatomaceous earth, etc. Silex is preferred because it can be obtained in the form of a fine powder, although any other finely divided abrasive material may be utilized. The preferred abrasives are, as indicated, fine powders with a particle size ranging from about 0.02mm to about 0.5mm, preferably from about 0.04mm to about 0.15mm, and most preferably at least 60 percent of the abrasive material and more desirably at least about 85–90 percent by weight thereof should pass through a sieve having 0.074mm openings. The abrasive ingredient constitutes about 50–98 percent by weight of the composition.

Another essential ingredient of this composition is water-soluble halide promotor such as chloride, bromide and iodide, with the chloride being preferred. The halide activates the metallic salt oxidant whereby stain removal is increased, whereas other anions such as nitrates and sulfates tend to inhibit aluminum removal. The function of the promotor is to speed up the stain removal and to obtain sufficient cleansing in the required time. In some cases, moderate stain removal is obtained without the promotor. Thus, it is apparent that anion effects must be considered and tested when formulating a complete cleanser. The halide promotor constitutes about 1–20 percent by weight of the total composition. Suitable promotors include any water-soluble salt, preferably inorganic, wherein the anion is chloride, bromide or iodide and the salt yields such ions in water. Illustrative compounds are the water-soluble alkali metal (e.g. sodium, potassium, lithium, etc.) chlorides, bromides and iodides and the water-soluble alkaline earth (magnesium, calcium, barium) bromides, chlorides and iodides.

Compounds may be utilized which are capable of performing more than one function such as cupric chloride, cupric bromide, stannous chloride, ferric chloride and auric chloride, etc. which combine the oxidant and promotor in a single compound.

The pH of the cleansing composition is preferably 0.5 to 5 although lower pH's (higher hydrogen ion concentration) will still be effective. The lower pH limit is determined by the acid concentration suitable for use in a general household product. More specifically the lower limit is the point beyond which the procelain enamel surface is attacked and the housewife's hands are irritated. The upper pH limit is determined by the precipitation of the metallic hydroxide and differs for each metal oxidant utilized. For example, for cupric ion the hydroxide begins to precipitate at about pH 4, while for the ferric ion the hydroxide precipitates at about pH 2. For non-metallic oxidants, the upper pH range is limited by the efficiency of the oxidant.

This cleansing composition may include other ingredients such as surface active agents (anionic, cationic and non-ionic) perfumes, fillers, diluents, colorants, etc. useful in household cleansers in widely varying proportions. However, where additives are used they should be selected and proportioned so as not to adversely affect the stain removal property of the composition. Generally from about 0.01 to about 20% by weight of these other ingredients may be used.

Any suitable water-soluble organic surface agent which is non-reactive with the metal salt oxidant ingredient may be utilized. The non-ionic detergents are preferred since they are completely non-reactive with the heavy metal ions of the oxidant ingredient. Suitable non-ionic detergents include the alkylene oxide condensation products of hydrophobic compounds such as ethylene oxide condensates with higher fatty acids, higher fatty acid amides, higher fatty alcohols or alkyl aryl hydrocarbons, having at least 5 and usually from 5 to 30 ethoxy groups per molecule i.e. coconut fatty acid monoethanol amide ethoxylated with 2 moles ethylene oxide, octyl phenoxy polyethoxy ethanol having 10 moles ethylene oxide.

The cationic quaternary compounds may also be utilized herein, since they do not adversely affect the oxidizing action of the metallic salt. Suitable cationic detergents include the quaternary ammonium compounds such as stearyl dimethyl benzyl ammonium chloride, N-difatty dimethyl quaternary ammonium chloride, i.e. N-distearyl dimethyl ammonium chloride.

The anionic detergents tend to react with the heavy metal ions, thereby reducing the efficacy of the cleanser. However, the phosphate esters such as the sodium salt of phosphated nonyl phenol condensed with 6 moles of ethylene oxide, has been found to be operable in this system. Other anionics can be used provided they do not react to form an insoluble product or a complex which ties up the metal ion. Thus, it is apparent, that the surface active agent utilizable herein, must not react with the heavy metal ion to remove the latter from being effective in the present oxidizing system.

The stain-removing ingredients of the instant invention which comprise essentially a metallic salt oxidant promotor and an abrasive is normally in the form of an abrasive scouring powder. However, said powder may be incorporated into an aqueous suspension by means of suspending agents to yield a liquid composition. Similarly, suitable materials may be added to yield a cream or paste. Thus, it is apparent that the instant composition may be in the form of a liquid, semi-liquid or solid by the addition of suitable ingredients which do not adversely affect the metallic stain removal properties thereof.

The following examples are illustrative of the invention and it will be understood that the invention is not limited thereto. Parts are by weight unless otherwise indicated.

EXAMPLE I

| Ingredients | Weight percent |
|---|---|
| $Cu Cl_2 \cdot 2H_2O$ | 5 |
| Citric acid | 2 |
| Silex | 93 |

This composition in the form of a 50 percent aqueous slurry having a pH of 1.5 is tested for dynamic stain removal of utilizing a toothbrush machine with a back and forth motion and an approximate 3 inch throw. The toothbrush head is weighted with a ¼ lb. weight using 85 strokes per minute on an etched porcelain white tile stained with aluminum pot marks. This composition results in 85 percent removal of stain in one minute which is far superior to the 30 percent stain removal obtained with a 5 percent $Cu Cl_2 \cdot 2H_2O$ 2 percent citric acid solution and 10% stain removal with a silex slurry separately.

EXAMPLE II

The citric acid of Example I is omitted, the $Cu Cl_2 \cdot 2H_2O$ increased to 10 percent, and the silex content reduced to 90 percent. A 50% aqueous slurry has a pH of 4 and removes 85 percent of the aluminum stain in one minute utilizing the same dynamic test as in Example I.

EXAMPLES III AND IV

| Ex. | Oxidant | Abrasive | pH | 30 inch dynamic test, 1 lb. weight. 36 strokes Al removal |
|---|---|---|---|---|
| III | 10% $Fe Cl_3 \cdot 6H_2O$ | 90% silex | 1.5 | 70% |
| IV | 10% $Sn Cl_2 \cdot 2H_2O$ | 90% silex | 1.4 | 80% |

EXAMPLE V

| Ingredients | Weight % |
|---|---|
| $Cu Cl_2 \cdot 2H_2O$ | 4% |
| Silex | 54% |
| Water | 42% |

This composition is applied to an etched porcelain white tile stained with aluminum pot marks for 2 minutes, resulting in 95 percent stain removal.

EXAMPLE VI

A cleansing composition is prepared containing 4 percent $Cu Cl_2 \cdot 2H_2O$. 0.02 percent Heliogen, 0.1 percent perfume, 3 percent coconut fatty acid monoethanolamide ethyoxylated with 2 moles ethylene oxide, 50 percent silex and the remainder water, at a pH of 3.2 – 3.8. This cleanser which exhibits excellent aluminum stain removal properties is stable over a long period of time (aged 37 days at 120°F) with no appreciable change in pH or reduction in aluminum stain removal efficiency.

EXAMPLE VII

A cleanser is prepared containing 10 percent $Cu Cl_2 \cdot 2H_2O$, 56 percent silex and 34 percent water, at a pH of 2.6. This composition exhibits very good aluminum stain removal properties and is stable for a protracted period of time (aged 37 days at 120°F) with no appreciable change in pH or reduction in aluminum stain removal efficiency.

EXAMPLE VIII

| Ingredients | % Weight |
|---|---|
| Oxalic Acid | 2 |
| Cupric sulfate, anhydrous | 2 |
| NaCl | 2 |
| $H_2O_2$ | 3 |
| Abrasive | 91 |

This composition, at a pH of 1.1 gives 85 percent aluminum stain removal and 90 percent rust removal in a 2 minute static test.

EXAMPLES IX AND X

Compositions containing 10 percent $CuCl_2 \cdot 2H_2O$ and 90 percent diatomaceous earth or 90% chalk give superior stain removing properties.

EXAMPLES XI AND XII

Similarly compositions containing 5 percent $CuCl_2 \cdot 2H_2O$ and 95 percent pumice or 95 percent kieselguhr yielded cleansers having excellent stain removing properties.

EXAMPLE XIII A–H

Example I is repeated except that the copper salt is replaced by the indicated amounts of the following with a corresponding adjustment of the percent silex so that the total weight percent equals 100 percent.

A. cupric nitrate — 10 percent; sodium chloride — 2 percent
B. cupric sulfate — 15 percent; sodium chloride — 5 percent
C. cupric sulfate — 5 percent; potassium bromide — 3 percent
D. cupric acetate — 5 percent; sodium bromide — 5 percent
E. mercuric chloride — 5 percent;
F. ferric nitrate — 5 percent; sodium chloride — 10 percent
G. cupric chloride — 2 percent Excellent stain removal is observed in each instance.

In the above examples, the silex has a particle size such that 99 percent of the particles are less than 0.15mm and over 90 percent pass through a sieve having 0.074mm openings.

Although the present invention has been described with reference to particular embodiments and examples, it will be apparent to those skilled in the art that variations and modifications of this invention can be made and that equivalents can be substituted therefor without departing from the principles and true spirit of the invention.

I claim:

1. A composition for removing a metallic stain of aluminum, magnesium, tin and iron from ceramic surfaces comprising
   a. about 50–98 percent of a finely divided abrasive,
   b. about 2–20 percent by weight of a water-soluble metal salt oxidant yielding metallic ions in water, the said metallic ion having a higher oxidation potential than the metal of said metallic stain to be removed and being selected from the group consisting of ferric, stannous, cupric, mercuric, auric and silver, the anion of said metal salt oxidant being an anion which in said salt produces a product which is soluble in water to the extent of at least 2 percent by weight, and selected from the group consisting of chloride, bromide, iodide, sulfate, nitrate and acetate, and
   c. where the anion of said oxidant salt is sulfate, nitrate, or acetate, about 1–20 percent of a water-soluble promotor, said promotor being selected from the group consisting of water-soluble alkali metal and alkaline earth metal chlorides, bromides and iodides said promotor yielding in water the corresponding ions, said composition having a pH ranging from 0.5 to 5.

2. A composition as defined in claim 1 wherein said oxidant is selected from the group consisting of cupric chloride, ferric chloride, stannous chloride, cupric nitrate-sodium chloride, cupric sulfate-sodium chloride, cupric sulfate-potassium bromide, cupric acetate-sodium bromide, mercuric chloride, ferric nitrate-sodium chloride and silver nitrate.

3. A composition as defined in claim 1 wherein said abrasive is selected from the groups consisting of silex, feldspar, ground quartz, pumice, chalk, tripoli, kieselguhr and diatomaceous earth.

4. A composition as defined in claim 1 further containing hydrogen peroxide as a supplementary oxidant.

5. A composition as defined in claim 1, wherein the abrasive is silex.

6. A composition as defined in claim 1, which also contains a water-soluble, organic anionic, cationic or nonionic surface active agent non-reactive with the metal salt oxidant.

7. A composition as defined in claim 1, wherein the metal salt oxidant is cupric chloride.

* * * * *